Jan. 15, 1963   F. M. POTTER   3,073,979
A.C. GENERATOR NEGATIVE SLIP RING CONSTRUCTION
Filed Sept. 28, 1959

INVENTOR.
FREDERICK M. POTTER
BY
ATTORNEY

United States Patent Office 3,073,979
Patented Jan. 15, 1963

3,073,979
A.C. GENERATOR NEGATIVE SLIP RING CONSTRUCTION
Frederick Milton Potter, Westwood, N.J., assignor to The Bendix Corporation, a corporation of Delaware
Filed Sept. 28, 1959, Ser. No. 842,938
1 Claim. (Cl. 310—231)

The present invention relates to dynamoelectric machines and more particularly to slip ring assemblies for dynamoelectric machines.

Slip ring and brush performance has been a problem of long standing on A.C. dynamoelectric machines, especially the excessive rate of wear and deep grooving of the negative slip ring. On modern aircraft, this has been amplified by the introduction of cores built into the brushes to provide altitude protection. In large power generating stations it has been the practice to reverse the polarity of the slip rings at frequent intervals. However, this is not practical for aircraft generating systems.

The present invention provides a novel slip ring assembly that overcomes the problem of excessive wear of the negative slip ring by making the negative ring out of carbon and using a brush with a high copper content.

It is an object of the invention to provide an improved dynamoelectric machine.

Another object of the invention is to provide a novel slip ring assembly for an A.C. dynamoelectric machine.

Another object of the invention is to provide means for reducing the excessive wear of negative slip rings.

Another object of the invention is to provide a novel slip ring that is readily replaceable.

Another object of the invention is to provide improved means for an electrical connection to a rotating armature.

The above and other objects and features of the invention will appear more fully hereinafter from a consideration of the following description taken in connection with the accompanying drawing wherein one embodiment of the invention is illustrated by way of example.

Figure 2:
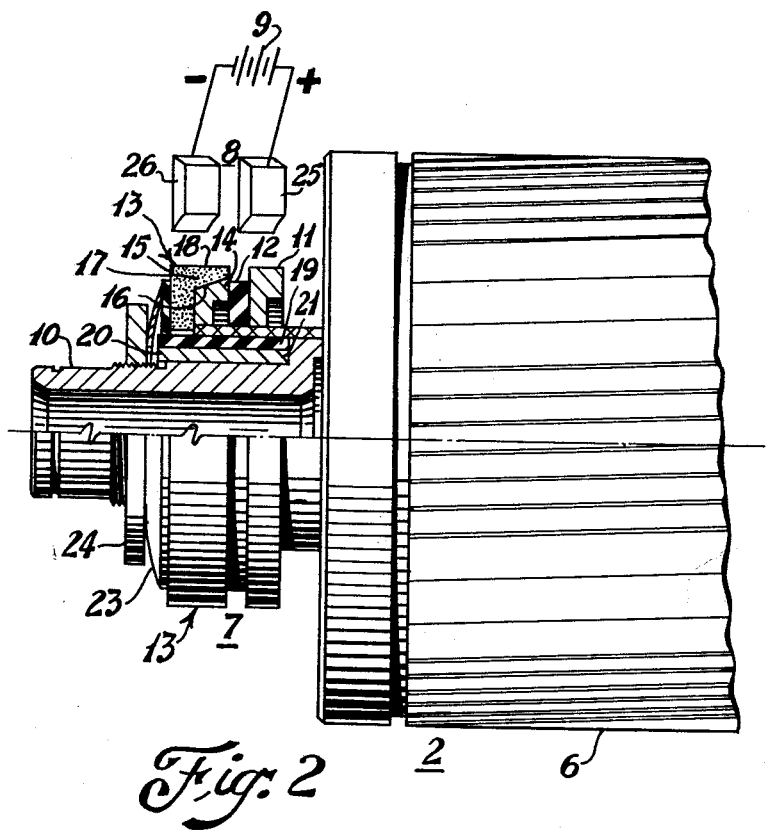
FIGURE 2 is a partial cutaway view of the rotor and brushes of the generator illustrated in FIGURE 1.
Figure 1:
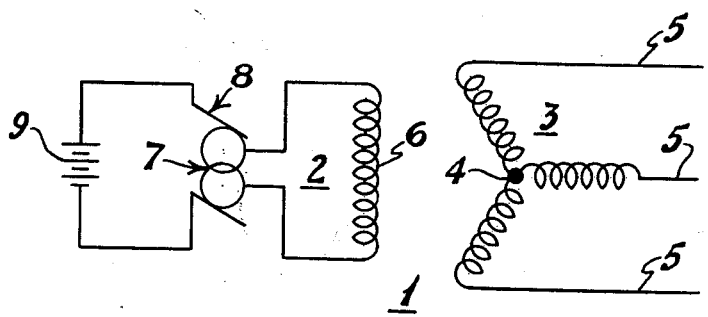
FIGURE 1 is a schematic diagram of an A.C. generator embodying the invention.

Referring now to the drawing, an A.C. generator is indicated generally by the numeral 1 and has a rotor 2 and stator 3. The stator 3 is illustrated as having a three-phase output winding 4, which is connected by suitable conductors 5 to a load (not shown). While a three-phase output winding has been used for illustration, it is understood that the output winding may be singlephase or multiphase.

The rotor 2 has an excitation winding 6 connected by slip ring assembly 7 and brush assembly 8 to a suitable source of direct current, which for the purpose of illustration, is shown as a battery 9. The rotor 2 may be driven for rotation by any suitable prime mover (not shown).

The rotor 2 includes a shaft 10 (see FIGURE 2) upon which is mounted the excitation winding 6 and the slip ring assembly 7. The slip ring assembly 7 has a positive slip ring 11 spaced by an insulating member 12 from negative slip ring 13. The positive slip ring 11 is of the conventional copper ring.

The negative slip ring 13 has an inner ring 14 of copper and an outer ring 15 of carbon. It is understood that the carbon ring may be impregnated or otherwise altitude treated. The inner ring 14 has an inclined surface 16 adapted to mate with an inclined surface 17 on the underside of an axially extending portion of the ring 15.

The rings 11 and 14 together with the insulation member 12 are assembled in a conventional manner such as being pressed on an insulating cylinder 19 mounted on a metallic cylinder 20. This assembly is then placed on the shaft 10 and positioned by a shoulder 21 thereon. The carbon ring 15 is then positioned with the inclined surface 17 mating with the inclined surface 16. An insulating member 22 is placed adjacent to the carbon rings 15. A spring washer 23 and nut 24 hold the rings 14 and 15 in intimate contact. While the nut 24 is illustrated as threaded on the shaft 10, it is understood that it could be threaded on the cylinder 20. In the latter case the assembly could be made before placing on the shaft 10.

In the brush assembly 8, a conventional carbon brush 25, which may be impregnated for improved performance at high altitudes, is adapted to provide an electrical contact with the positive slip ring 11. A brush 26, having a high copper content (80 to 90 percent), provides means for making an electrical contact with the negative slip ring 13. The brush 26 may be of a type similar to that used in the convention automotive starter. Although only a pair of brushes have been illustrated, it is understood that there may be one or more pairs of brushes utilized in the machine.

By the provision of the inclined surfaces on the rings 14 and 15 and the spring washer, compensation for differences in thermal expansion of the different materials is obtained. Further, this feature makes the carbon ring 15 readily replaceable.

In operation the current flow would be from carbon to copper, such as is normal for the positive slip ring, by having the negative slip ring of carbon and the negative brush having a high copper content.

Although only one embodiment of the invention has been illustrated and described, various changes in the form and relative arrangement of the parts, which will now appear to those skilled in the art, may be made without departing from the scope of the invention.

What is claimed is:

A slip ring assembly for an A.C. generator rotor, having a shaft extending therefrom, comprising a metallic cylinder adapted for positioning on said shaft, an insulating cylinder surrounding said metallic cylinder, a copper ring pressed on and positioned adjacent one end of said insulating cylinder, an insulating ring positioned adjacent to said copper ring, a second copper ring pressed on said insulating ring adjacent to the other side of said insulating ring, said second copper ring having a diameter less than said first copper ring, a carbon ring having a portion positioned to telescope said second copper ring, and yieldable means for holding said carbon ring into intimate contact with said second copper ring, said yieldable means permitting thermal expansion between said carbon ring and said second copper ring.

References Cited in the file of this patent

UNITED STATES PATENTS

| | | |
|---|---|---|
| 2,213,343 | Hensel | Sept. 3, 1940 |
| 2,623,188 | LeTourneau et al. | Dec. 23, 1952 |
| 2,718,604 | Herrick | Sept. 20, 1955 |
| 2,767,264 | Scott | Oct. 16, 1956 |